United States Patent
Marquis et al.

(10) Patent No.: US 6,776,187 B1
(45) Date of Patent: Aug. 17, 2004

(54) QUICK COUPLING WITH PRESSURE ASSIST PISTON

(75) Inventors: Timothy Tyler Marquis, Lincoln, NE (US); Ojars Maldavs, Lincoln, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/694,114

(22) Filed: Oct. 27, 2003

Related U.S. Application Data

(60) Provisional application No. 60/452,905, filed on Mar. 6, 2003.

(51) Int. Cl.[7] .............................................. F16L 29/00
(52) U.S. Cl. ........................... 137/614.04; 137/614.03; 251/149.6
(58) Field of Search ...................... 137/614.04, 614.03, 137/614.05, 614; 251/149.6

(56) References Cited

U.S. PATENT DOCUMENTS

| | | | | |
|---|---|---|---|---|
| 4,077,433 A | * | 3/1978 | Maldavs | ................ 137/614.04 |
| 4,303,098 A | | 12/1981 | Shindelar | |
| 4,373,551 A | | 2/1983 | Shindelar | |
| 4,582,295 A | | 4/1986 | Kugler et al. | |
| 5,937,899 A | * | 8/1999 | Zeiber | ........................ 137/614 |
| 6,016,835 A | * | 1/2000 | Maldavs | ................ 137/614.05 |
| 6,026,857 A | | 2/2000 | Stucchi | |
| 6,095,190 A | | 8/2000 | Wilcox et al. | |
| 6,145,539 A | * | 11/2000 | Wilcox et al. | ......... 137/614.03 |
| 6,382,251 B1 | | 5/2002 | Hopson | |
| 6,655,656 B2 | * | 12/2003 | Maldavs | .................. 251/149.6 |

* cited by examiner

Primary Examiner—Kevin Lee
(74) Attorney, Agent, or Firm—Joseph J. Pophal

(57) ABSTRACT

A female coupler for use as a fluid connector having an exterior portion, an interior portion, a poppet valve and a piston. The exterior portion has an internal bore with an open forward end adapted to receive a male coupler, a flow port for supplying pressurized fluid to the internal bore, an internal surface with at least one groove and at least one outlet passage through the exterior portion fluidly communicating with the at least one groove. The interior portion has a main cavity and an internal valve seat and is disposed within the housing bore and axially movable within the exterior portion from a first position, in which fluid is sealed within the female coupler, to a second position in which fluid can exit the female coupler. The poppet valve is slidably received within the interior portion and spring-biased forwardly against the valve seat to normally prevent fluid flow through the interior portion. The generally annular piston is disposed and slidably received within the exterior portion and includes a tubular main portion disposed within the interior portion, a radially enlarged annular end portion which engages said interior portion when moved axially to assist in moving the poppet valve and a central bore for receiving fluid flow.

22 Claims, 13 Drawing Sheets

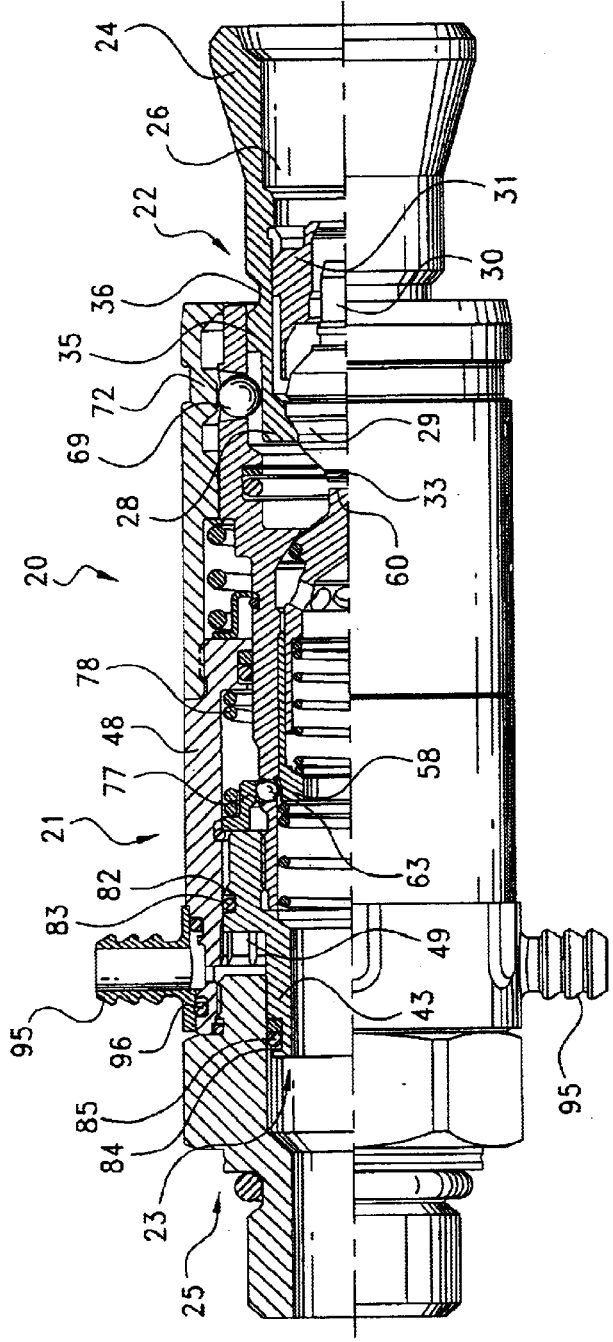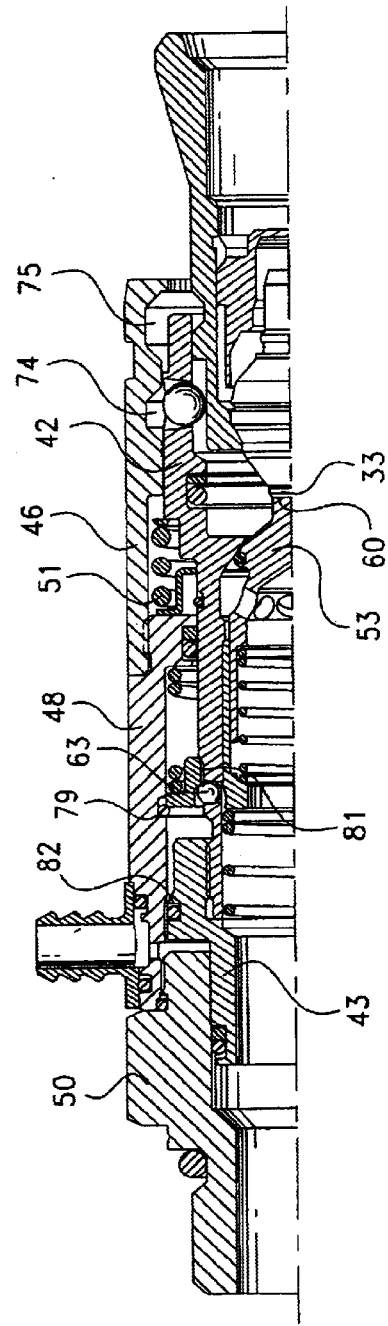

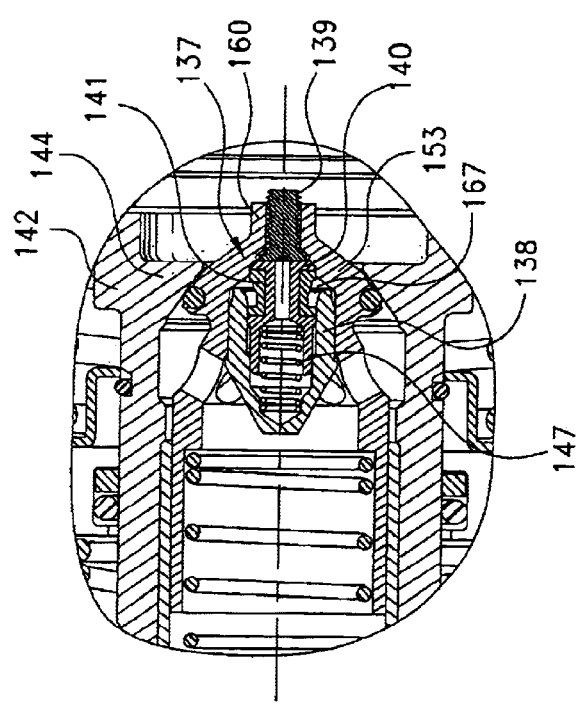
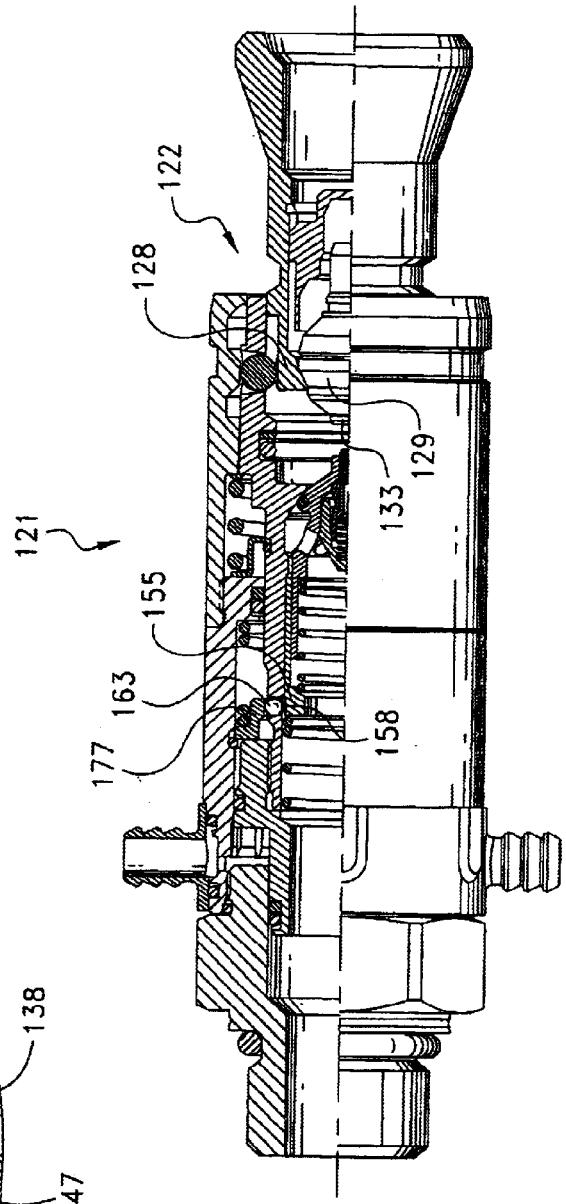

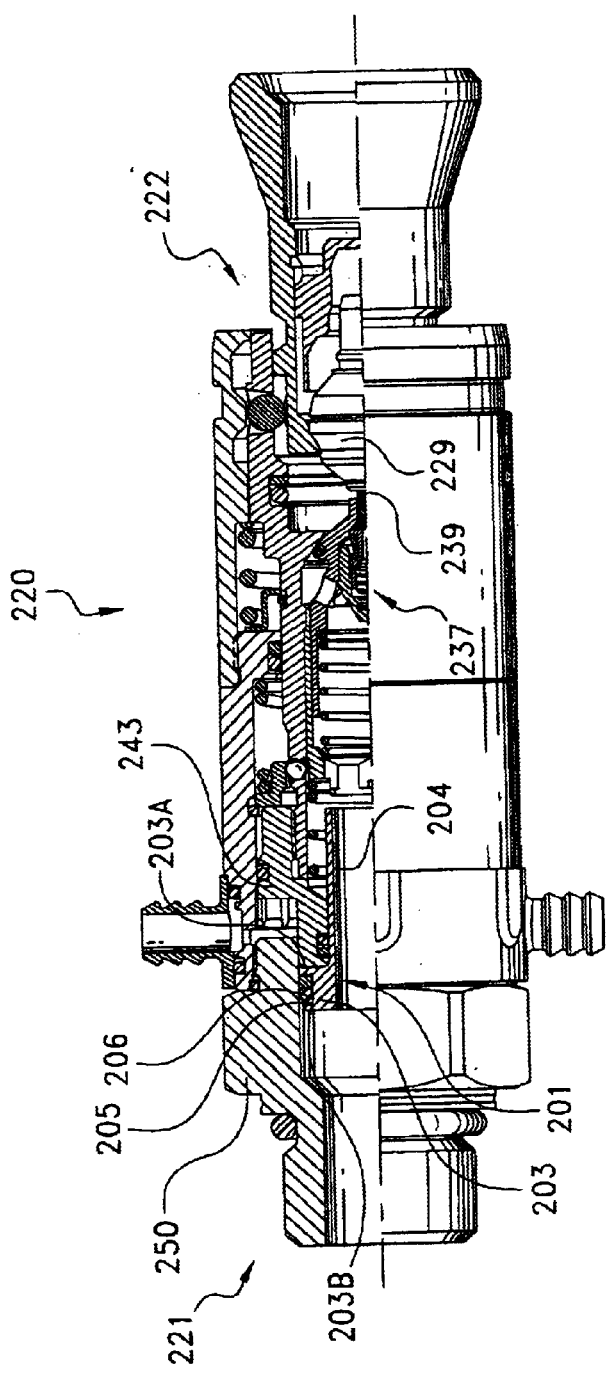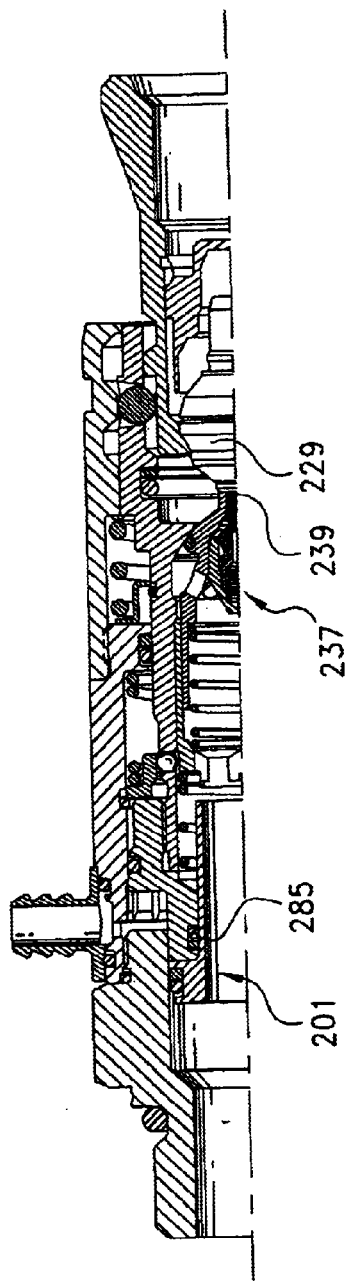

QUICK COUPLING WITH PRESSURE ASSIST PISTON

CROSS-REFERENCE TO RELATED CASES

The present application claims the benefit of the filing date of U.S. Provisional Application Serial No. 60/452,905 filed Mar. 6, 2003, the disclosure of which is incorporated herein by reference.

FIELD OF THE INVENTION

The present invention relates to quick disconnect couplings and, more particularly, to a female quick disconnect coupler for pressurized fluid lines.

BACKGROUND OF THE INVENTION

Quick connect couplings are used, for example, to connect hoses in hydraulic fluid lines. A typical application is on agricultural tractors to connect the tractor hydraulic system with attachable implements. The tractor typically includes one or more female coupler sockets, while the implements include one or more male coupler nipples. Pneumatic and other applications for such couplings are also well known.

Over the years changes have occurred in these systems which have required changes and performance improvements in the couplings. It is desirable for these couplings to connect regardless of trapped pressures within either the male or female side. It is also desirable for these couplings to connect without excessive leakage of fluid during attachment.

One early coupling design is shown in U.S. Pat. No. 4,077,433 where the female coupler includes a valve body slidable within the housing and a poppet valve internal to the valve body. The poppet valve is axially movable to engage a check valve in a male coupler when the male coupler is inserted into the female coupler. When low pressure is present in the male coupler, the poppet valve moves the check valve off its valve seat to allow flow from the female coupler to pass to the male coupler. When higher pressures are present in the male coupler, an internal passage in the poppet valve provides incoming fluid pressure to the rear surface of the poppet valve. Due to the differences in effective surface areas, the fluid pressure assists in driving the poppet valve against the check valve to move the check valve into an open position.

Other prior art designs accommodate for high pressures within the female coupler that make connection with a nonpressurized, or low pressurized, male coupler difficult. An example of this type of design is shown in U.S. Pat. No. 6,095,190 to Wilcox et al. In this design the female coupler has a relief valve integrated within a main valve which reduces pressure behind the main valve so as to permit easy coupling under pressure. However, an obstacle with this, and similar designs, is in the activation of the relief valve. If the seals within the valve are not balanced, the pressure force acting on valve will be difficult to overcome with a low pressurized male coupler. The addition of a relief valve also adds to the cost, complexity and size of the coupler.

In order to attach a nonpressurized, or low pressurized, female coupling with a high pressurized male coupler, prior art designs have added a hydraulic piston to the female half. An example of this type of design is shown in U.S. Pat. No. 6,016,835 to Maldavs. This design details a quick disconnect coupling wherein the female coupler includes a housing adapted to receive the male coupler. The housing includes a valve body slidable within the housing, and a poppet valve internal to the valve body. The piston surrounds the poppet valve to assist in moving the poppet valve against the check valve in the male coupler. Without the piston, pressure will act on both sides of the male half valve. Therefore, in order to force the male valve open, the pressure in the female half must exceed the pressure in the male half. With the addition of the hydraulic piston, the amount of area that the female pressure will act upon can be doubled or tripled. Therefore, a much higher force pushes through the female half poppet and opens the male half valve using much lower pressures. The obstacle with this type of design is that the piston is independent of the internal balancing seals so that you may have an unbalanced force within the female coupler tending to uncouple the coupling.

SUMMARY OF THE INVENTION

The present invention provides improvements in female couplers which overcome one or more of the aforesaid problems encountered with prior art female couplers.

According to one feature of the present invention, a female coupler, used as a fluid connector, includes an exterior portion, an interior portion and a poppet valve. The exterior portion has an internal bore with an open forward end adapted to receive a male coupler, a flow port for supplying pressurized fluid to the internal bore, an internal surface with at least one groove section and at least one outlet passage through the exterior portion for fluid communication with the at least one groove section. The interior portion is disposed within the internal bore and is axially movable within the exterior portion from a first position, in which fluid is sealed within the female coupler, to a second position, in which fluid can exit the female coupler through the at least one groove section. The interior portion includes a main cavity opening towards the exterior portion forward end and a valve seat. The poppet valve is slidably received within the interior portion and is spring-biased forwardly against the valve seat to normally prevent fluid flow through the valve portion. The poppet valve includes a valve seal portion, a forward projection adapted to engage a check valve in the male coupler when the male coupler is received in the exterior portion.

Another feature of the noted female coupler has the interior portion including a body and a seal gland. The seal gland houses a peripheral seal that is axially spaced from the at least one groove section when the interior portion is in the first position and is axially aligned with the at least one groove section when the interior portion is in the second position. A further feature has the seal gland including a first balanced seal residing in a circumferential groove in its rear external surface and the peripheral seal being balanced and residing in a circumferential groove in its front external surface. The exterior portion includes a balanced seal residing in a circumferential groove in its interior surface.

Still another feature has the noted female coupler including a generally tubular sleeve with an internal bore with an open forward end, disposed within the interior portion and being axially movable, relative to the interior portion, from a locked position with the interior portion to an unlocked position. The poppet valve can further include a rearward tubular portion received within the sleeve and having an outside diameter slightly less than the inside diameter of the sleeve. Further, the sleeve can have an internal shoulder for limiting the axial movement of the poppet valve.

In a preferred embodiment, the poppet valve has a pressure relief valve fixedly positioned within with a pressure relief pin located at its front axial end. The relief pin is adapted to contact the male coupler check valve and relieve pressure within the female coupler when the interior portion is in the first position and prior to engagement of the forward projection with the male coupler. Still yet another feature has the relief valve including a valve body having an internal cavity that houses a spool with an external circumferential groove for receiving a balanced seal that prevents the escape of fluid from the female coupler prior to the pin contacting the male coupler check valve.

In another preferred embodiment, a generally annular piston is disposed and slidably received within the exterior portion. The piston includes a tubular main portion, a radially enlarged annular end portion and a central bore for fluid flow. The tubular main portion is disposed and slidably received within the interior portion and has an outer surface in sealing contact with the inner surface of the interior portion. The radially enlarged end portion engages the interior portion and assists in moving the poppet valve axially against excessive pressures in the male coupler.

Another feature of the female coupler includes a sleeve, having an internal bore with an open forward end, disposed within the interior portion and axially movable relative to the same from a locked position with the interior portion to an unlocked position. Further, the poppet valve has a rearward tubular portion nested within the sleeve and an outside diameter slightly less than the inside diameter of the sleeve. Further features and advantages of the present invention will become apparent to those skilled in the art upon review of the following specification in conjunction with the accompanying drawings.

BRIEF DESCRIPTION OF THE DRAWINGS

FIGS. 2a–2f are views similar to FIG. 1, but showing the progressive step by step process of connecting the male coupler with the female coupler, beginning with closed, disconnected couplers and ending with open, connected couplers.

FIG. 6 is an enlarged portion of FIG. 5, showing a pressure relief valve in its relaxed position.

FIG. 7 is a side elevational view, partially in section, of a disconnected quick connect coupling assembly with the male coupler entering a cavity in the female coupler shown in FIG. 5.

FIGS. 9a–9f are side elevational views, partially in section, of an additional embodiment according to the present invention, detailing the progressive step by step process of connecting the male coupler with the female coupler, beginning with closed, disconnected couplers and ending with open, connected couplers.

DETAILED DESCRIPTION OF THE PREFERRED EMBODIMENT

Figure 1:
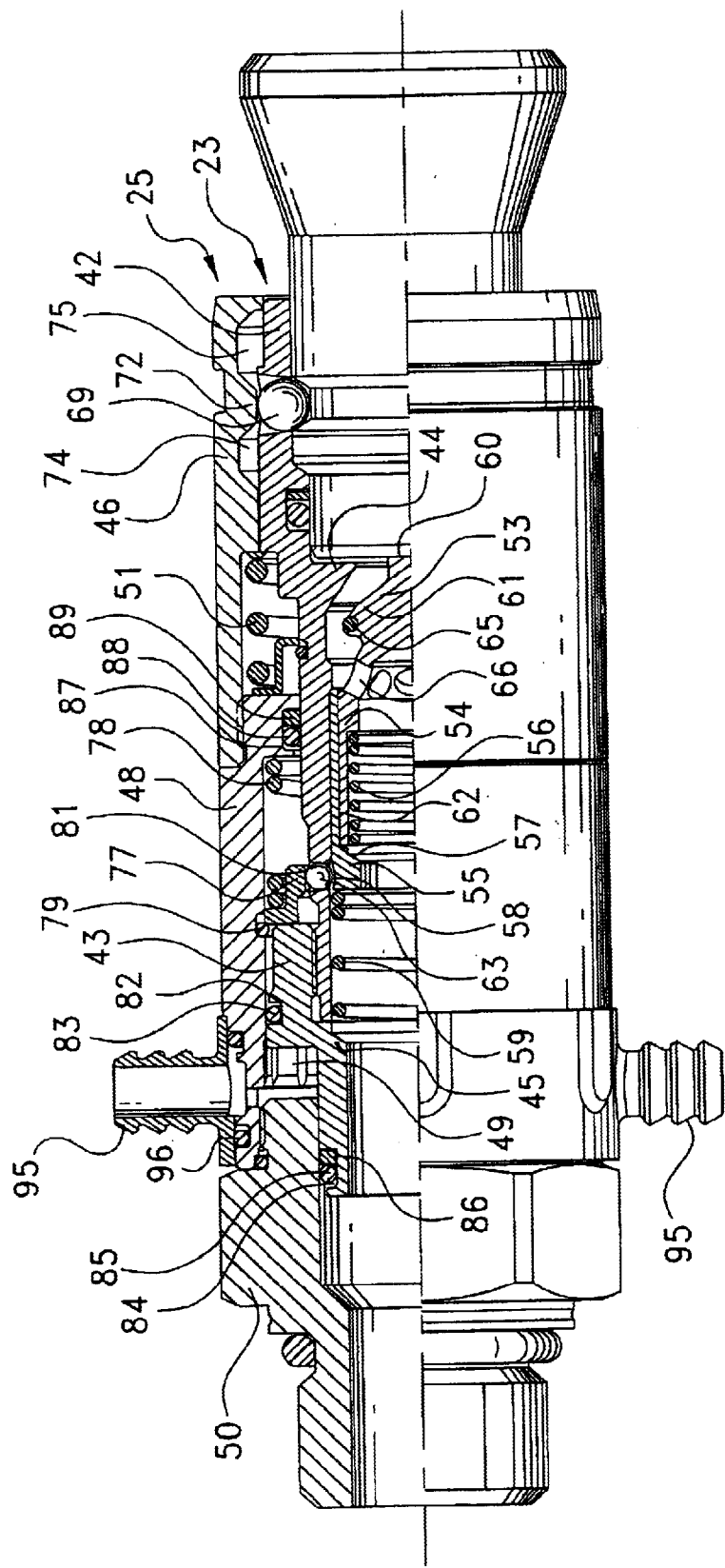
FIG. 1 is a side elevational view, partially in section, of a female coupler according to one embodiment of the present invention, with a male coupler fully inserted and attached with the female coupler shown in an open, connected mode.

Referring to the drawings and initially mainly to FIGS. 1 and 2a–2c, a quick disconnect coupling assembly 20 of the present invention is shown, and includes a female coupler half, or socket, 21 and a male coupler half, or nipple, 22. Male coupler 22 and female coupler 21 have much of the same structure and function as shown in U.S. Pat. No. 6,029,701, which is incorporated herein by reference. The novel differences between the present invention and the above-identified patent will primarily be described below.

Male coupler 22, which is typically mounted on an agricultural implement, is a conventional, commercially-available male coupler and includes an outer tubular housing 24 having an internal bore 26. Male coupler 22 is closed off by a valve which is comprised of a seat 28 and a sealing member 29. Sealing member 29 is extended on its interior by a guide rod 30 that slides axially within a tubular part 31 fixed in position within outer tubular housing 24. Male coupler 22 has a cylindrical nipple 33 that is adapted to engage with female half 21 as will be described below. Male coupler 22 also includes an exterior annular projection 35 that helps define an annular groove 36.

Female coupler 21, which is typically mounted on a mobile piece of farming equipment, e.g. a tractor, generally includes an interior portion 23, comprised of a body 42 and a seal gland 43, and an exterior portion 25, comprised of a collar 46, a female housing 48, and a fitting 50. Body 42 and seal gland 43 are movable and slide with respect to exterior portion 25. A centering spring 51 is located between collar 46 and body 42 and normally holds each in the relative position shown in FIG. 2a.

Female housing 48 has a series of spaced, parallel, preferably longitudinally-directed grooves 49 within its interior surface which provide a path for fluid migrating out of quick coupling assembly 20 through at least one vent connector 95 attached to the external surface of housing 48. A seal 96 is placed in a groove in the outer surface of housing 48 and prevents fluid from leaking past the interface between housing 48 and vent connector 95.

Seal gland 43 has a first exterior groove 82 in its frontal surface that receives a seal 83 which prevents fluid from leaking past the interface of seal gland 43 and female housing 48 when seal gland 43 is in the position shown in FIG. 2a. As best seen in FIG. 1, seal gland 43 has a second exterior groove 84 in its rear surface that receives a seal 85 and a backup washer 86 which prevents fluid from leaking past the interface of seal gland 43 and fitting 50. Female housing 48 has an interior groove 87 that receives a seal 88 and a backup washer 89 which seal off the interface between female housing 48 and body 42.

Body 42 houses the female valve portion which includes a poppet 53 that slides within a sleeve 55. Sleeve 55 is disposed within and axially movable relative to body 42. A valve seat 44 is formed by an annular projection in body 42. A poppet spring 56 engages a shoulder 54 of poppet 53 and biases same towards valve seat 44. Sleeve 55 is substantially tubular and includes an internal shoulder 57 to receive one end of poppet spring 56, and an external groove 58 having inclined lateral faces to receive a plurality of locking balls 63. Such balls 63 are engaged in radial bores located in the wall of body 42 and are radially movable in such bores for locking purposes. The rear wall of sleeve 55 abuts a return sleeve spring 59, which in turn pushes against a shoulder 45 formed in seal gland 43.

In order to minimize the required space, and reduce the cost, poppet 53 is nested inside of sleeve 55. The front end of poppet 53 includes an inclined portion 61 that forms a valve sealing surface with valve seat 44. A seal 65 on poppet 53 provides a seal between poppet 53 and valve seat 44. A cylindrical nipple 60 extends forwardly from the front end of poppet 53. Holes 66 are provided in poppet 53 directly behind seal 65 and are angled to enable fluid to flow therethrough. The rear end surface 62 of poppet 53 is shaped for engagement with sleeve internal shoulder 57.

Body 42 receives a further plurality of locking balls 69 engaged in radial bores located in its walls. Balls 69 are radially moveable within these bores between a fully interior position shown in FIG. 1 and a fully exterior position shown in FIG. 2c. Collar 46 includes an annular projection 72 with inclined side faces that serve to define two grooves 74, 75.

Body 42 and female housing 48 are formed such that they define between them an annular space to receive a locking sleeve 77, with an internal conical shoulder 81 and an external annular projection, a locking sleeve spring 78, and a retaining ring 79 inserted and held in a notch located in the internal surface of female housing 48.

Figure 2C:
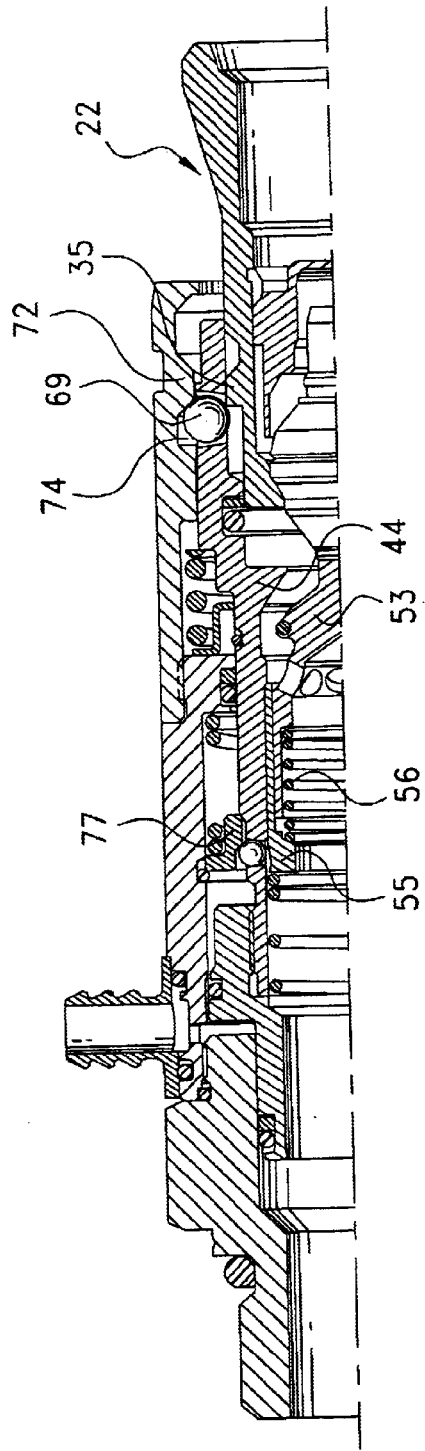
Figure 2D:
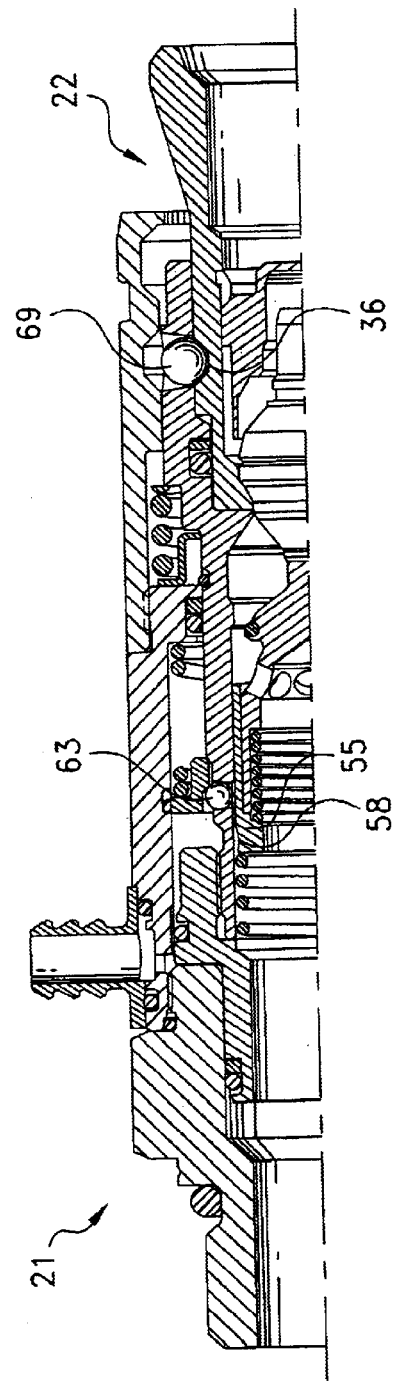
Figure 2E:
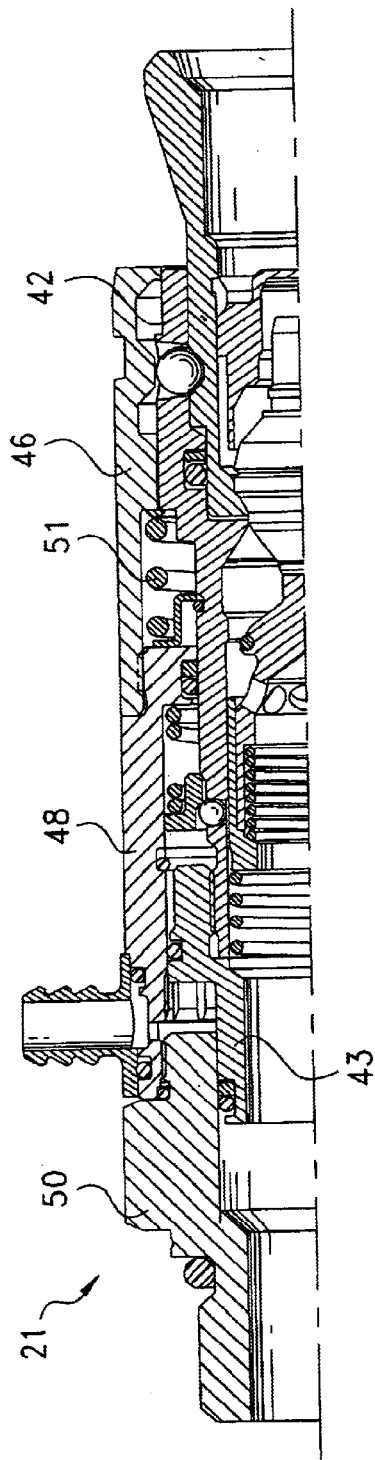
Figure 2F:
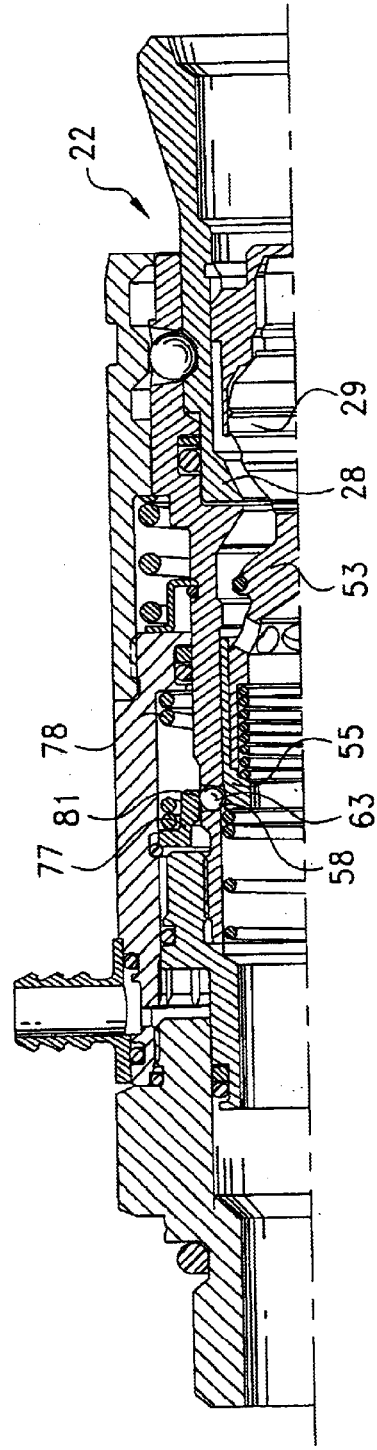

It is deemed to be evident from a perusal of FIGS. 2a–2f that retaining ring 79 is shaped so as to engage with the external annular projection of locking sleeve 77 and to displace locking sleeve 77 against spring 78 during the coupler connection. Internal conical shoulder 81 of locking sleeve 77 is shaped such that, depending on its position, locking balls 63 are retained in an interior position as shown in FIGS. 2a and 2f, displaced off shoulder 81 as shown in FIGS. 2b and 2c, or pushed off sleeve external groove 58 as shown in FIGS. 2d and 2e.

Referring again to FIGS. 2a–2f, the progressive connecting sequence of a pressurized male half 22 and pressurized female half 21 will now be described. FIG. 2a shows the start of the connection process when male half 22 is inserted into the cavity of female half 21. Locking sleeve 77 has linked locking balls 63 into their innermost position in which balls 63 are engaged in sleeve external groove 58. Referring to FIG. 2b, cylindrical nipple 33 of male sealing member 29 contacts the corresponding nipple 60 of female poppet 53. The continued engagement causes female body 42 and seal gland 43 to be displaced rearwardly (or to the left) in relation to exterior portion 25, including female collar 46, housing 48 and fitting 50. Such displacement causes centering spring 51 to be compressed and balls 63 to be displaced axially beyond conical shoulder 81 of locking sleeve 77. Such displacement continues until locking balls 69 approach groove 74 in collar 46, thereby moving locking balls 69 out of contact with collar annular projection 72.

Figure 4:
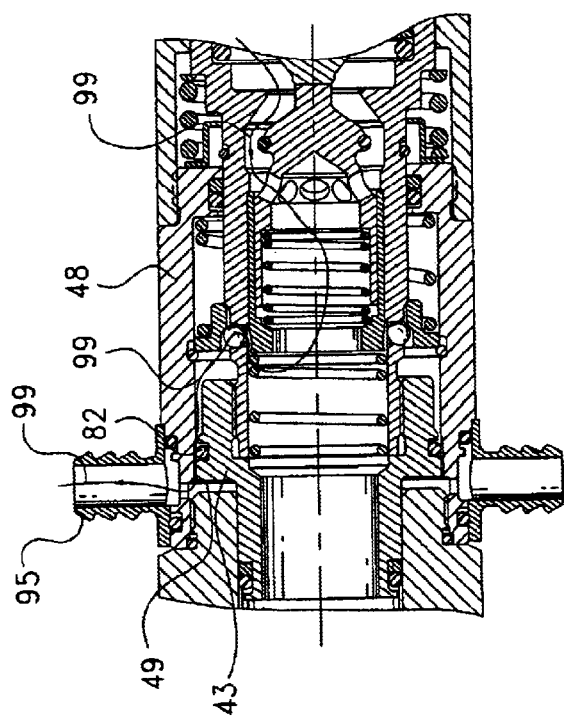
FIG. 4 is a close-up, enlarged, cross-sectional view of the flow path of fluid inside the female coupler when connected with a male coupler (not shown).

It should be noted that although both male 22 and female 23 halves are pressurized, these pressures could be unequal thus causing a greater resistance in one of the halves during coupling. In order to relieve pressure from female half 23, the pressurized fluid has to exit therefrom. Many existing prior art couplers can relieve female half pressure, and fluid, by allowing the fluid to spill during the connect phase. Typically, this fluid is drained off into a dirty oil container or is simply drained onto the ground. In the present invention, as seal gland 43 is moved during the insertion of male half 22 into female half 23, it passes over grooves 49 in housing 48, thereby both relieving the pressure, and allowing the fluid, to bleed past seal 83. Prior to the insertion of male half 22 into female half 23, when seal gland 43 is in the position shown in FIG. 2a, seal 83 prevents leakage between female housing 48 and seal gland 43 since it is not positioned over (or axially aligned with) grooves 49. Referring to FIG. 4, when the fluid (whose flow is indicated by arrows 99) passes seal 82 it is conveyed through vent connector 95 and back to tank (not shown). This prevents the fluid from being simply drained onto the ground.

Referring now to FIG. 2c, during the coupling phase, male half annular projection 35 encounters and drives locking balls 69 upwardly into groove 74. Since the pressure in female half 21 has been relieved, male half 22 can continue its engagement and move female poppet 53 off valve seat 44. Referring to FIG. 2d, since sleeve 55 is moving rearwardly (or towards the left), locking balls 63 are caused to rise out of external groove 58 and are at their outermost position. This allows male half 22 to fully engage into the cavity of female half 21. Locking balls 69 are driven into groove 36 such as to lock male half 22 and female half 21. Referring to FIG. 2e, centering spring 51 returns female half 21, namely body 42, seal gland 43, collar 46, female housing 48 and fitting 50, to their respective original positions. Referring to FIG. 2f, spring 78 is simultaneously released and brings conical shoulder 81 of locking sleeve 77 into renewed engagement with locking balls 63. When the pressure is established in female half 21, e.g. by means of a servo control valve (not shown) connected to female half 21, the pressurized fluid displaces sleeve 55 and poppet 53 towards male coupler 22, thus moving sealing member 29 off male seat 28. In this position, external groove 58 of sleeve 55 again faces locking balls 63 which are driven into groove 58 by locking sleeve 77. As long as the pressure in male half 22 does not exceed the working pressure of the mobile piece of equipment, male half 22 will remain open.

Figure 3A:
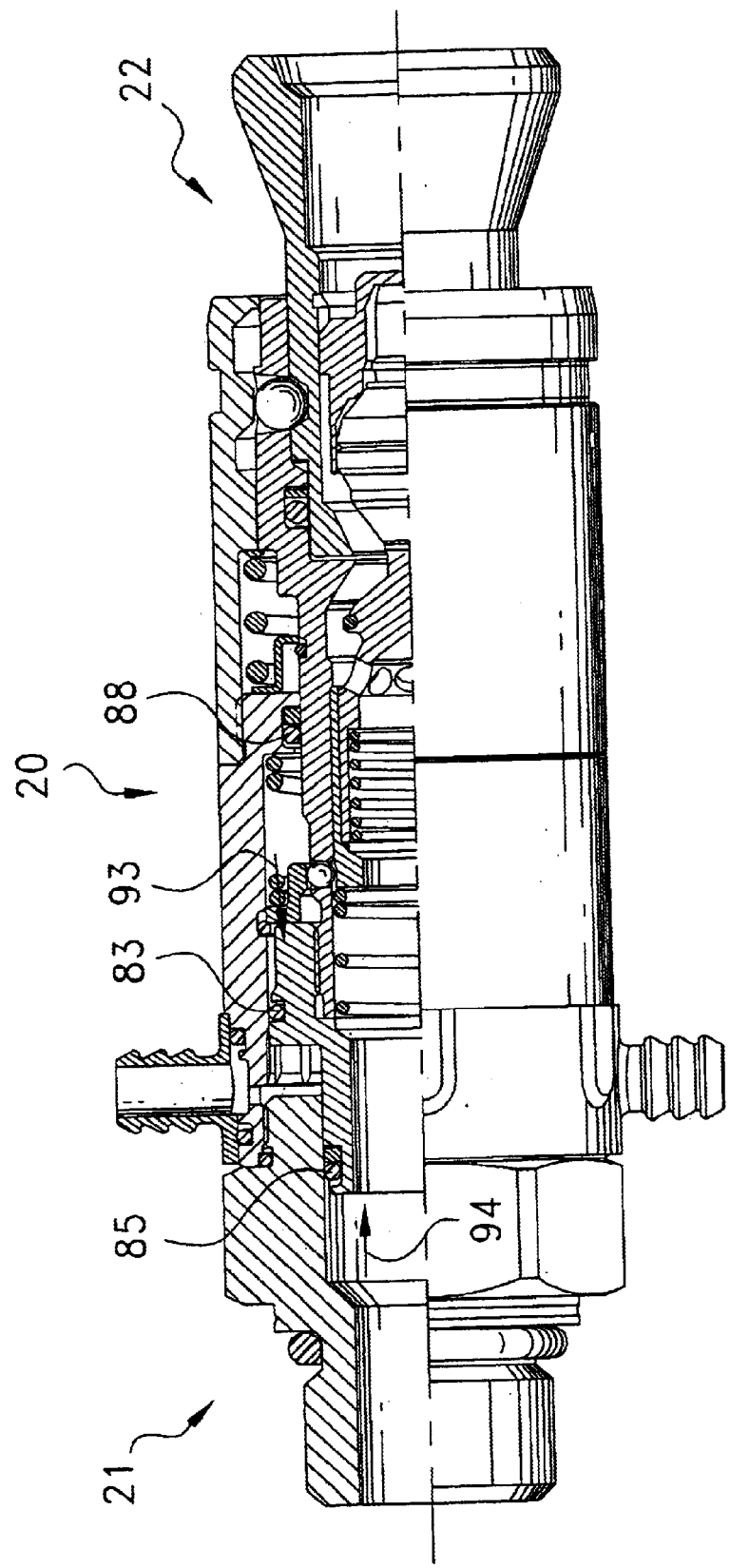
FIGS. 3a–3c are views similar to FIGS. 2a–2f, but showing the progressive step by step process of disconnecting the quick connect coupling assembly, beginning with open, connected couplers and ending with closed, disconnected couplers.

Referring to FIG. 3a, quick coupling assembly 20 remains balanced during pressurized operation. In an unbalanced coupling, as pressure increases, there will be a force building in one direction that will tend to separate the coupling. The structure of the present invention is balanced between three seals, 83, 85 and 88. Balanced quick coupling assembly 20 has the same force acting in both directions as indicated by arrows 93 and 94. Force 94 represents the pressure acting on the area inside seal 85. Force 93 represents the pressure acting on the difference of the area of seal 83 and the area of seal 88. These opposing forces are equal and oppositely-directed and thus balance coupling assembly 20. Assembly 20 will only stay connected under pressure, while still retaining its ability to uncouple while balanced.

Figure 3B:
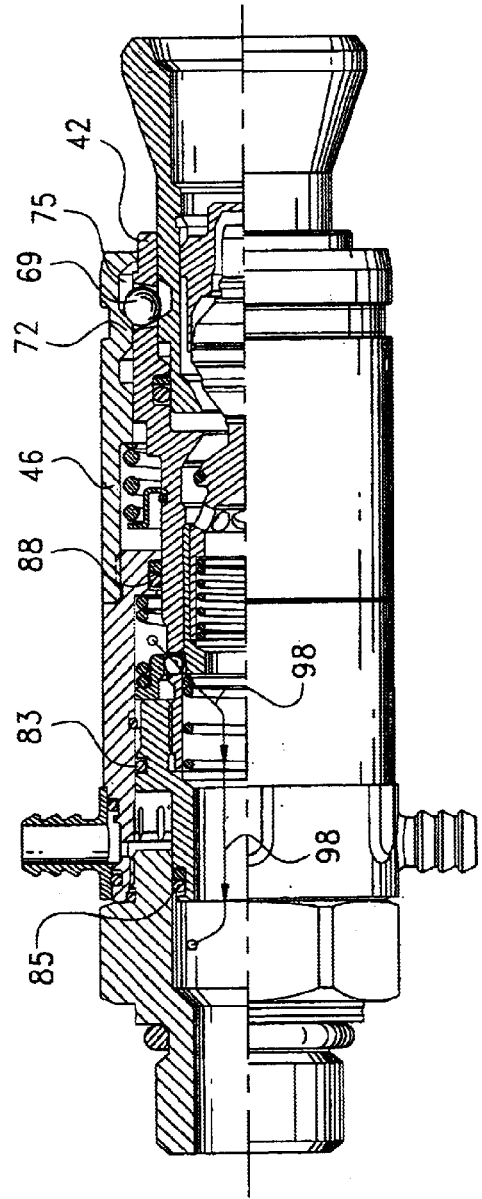
Figure 3C:
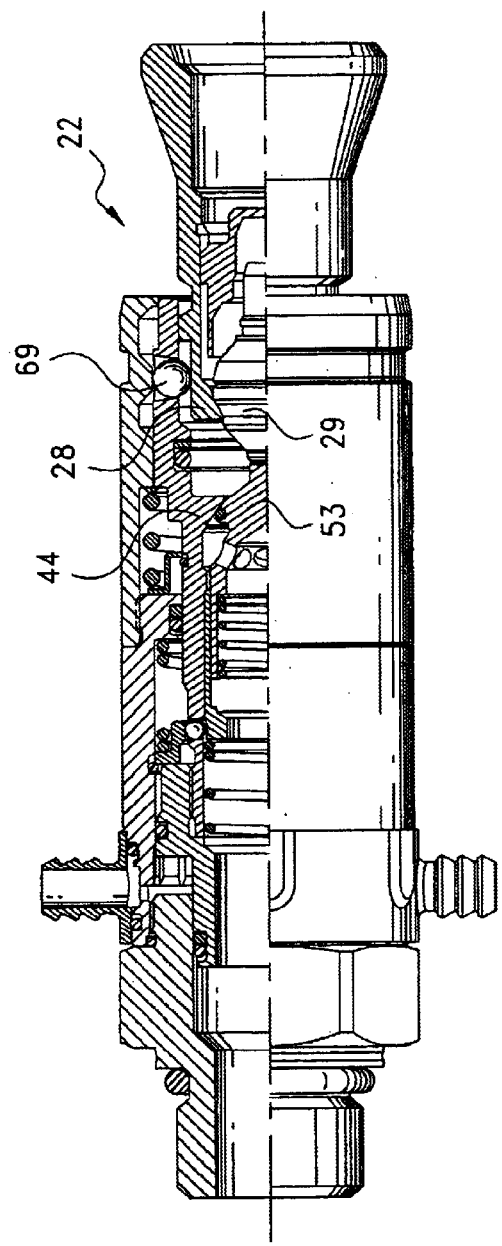

The disconnect sequence of quick coupling assembly 20 is progressively shown in FIGS. 3a–3c. FIG. 3a shows coupling assembly 20 in the coupled condition, either pressurized or unpressurized. To uncouple assembly 20, a pull force is exerted on male half 22 either by the operator or for safety breakaway. Referring to FIG. 3b, female body 42 cams forward (or is pulled by male half 22 to the right) until locking balls 69 passes into groove 75 of collar 46. Fluid can continue to flow through balanced seals 83, 85 and 88, as indicated by arrows 98. Referring to FIG. 3c, male half 22 is free from locking balls 69, and both female poppet 53 and male sealing member 29 spring to closed positions.

A further embodiment of the present invention is shown in FIGS. 5–8, which shows a female coupler 121. As can be seen, male half 122 takes the same form as male half 22 used in coupling assembly 20, previously described. Female coupler 121 is the same as female half 21 except for the addition of a balance pressure relief valve 137. Pressure relief valve 137 overcomes the obstacle encountered by an operator attempting to connect a pressurized female coupler with an un-pressurized male half. Without pressure relief valve 137, male half 122 does not have enough force to move componentry (specifically the pressurized seals) in the pressurized female coupler in order for un-pressurized male half 122 to lock with female coupler 121. Instead, the male coupler, and specifically the male sealing member or poppet, would begin to open before the pressure in the female half is relieved.

Figure 5:
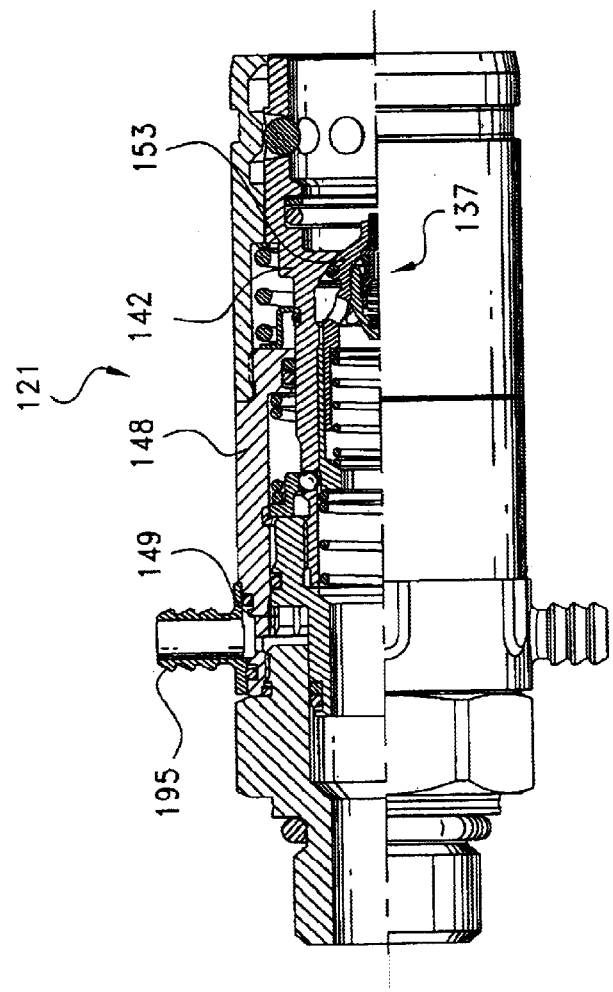
FIG. 5 is a side elevational view, partially in section, of a further embodiment of the female coupler according to the present invention.

Referring to FIGS. 5–6, a balanced seal pressure relief valve 137 is housed within a cavity inside of female poppet 153 and represents an improvement over a common spool valve, a valve well known in the art. It has a valve body 138 which encapsulates a spring 147 that in turn applies tension to a spool 140. Spool 140 has a recessed area on its external surface that houses a spool seal 141. The front portion of spool 140 contacts a lead pin 139 which is shaped so that it protrudes from cylindrical nipple 160 of female poppet 153. The outer cylindrical surface of body 138 contacts the inner cylindrical surface of female poppet 153. A gap 167 remains between spool 140, poppet 153 and seal 141. Specifically, the volume in front of spool 138, inside the frontal portion of poppet 153 and outside of seal 141 comprises gap 167 and holds pressurized fluid.

Figure 8:
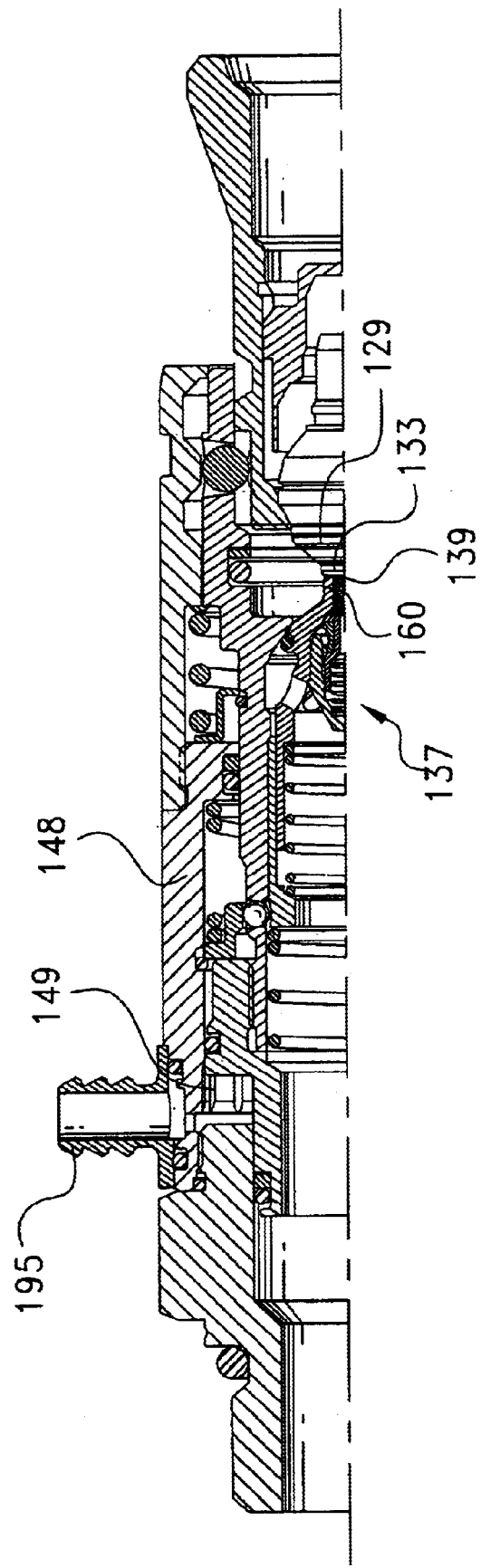
FIG. 8 is a limited side elevational view, partially in section, similar to FIG. 7, but with the pressure relief valve activated.

Referring to FIG. 7, when un-pressurized male half 122 approaches pressurized female coupler 121, it is received within the cavity of female half 121. Locking sleeve 177 has linked locking balls 163 into their innermost position in which balls 163 are engaged in sleeve external groove 158. Referring to FIGS. 6 and 8, cylindrical nipple 133 of male sealing member 129 contacts a pin 139 rather than immediately contacting cylindrical nipple 160 of female poppet 153, as in quick coupling assembly 20 described above. Pin 139 moves inwardly (or towards the left) and contacts the front surface of spool 140, thereby displacing spool 140, and seal 141, off the interior surface of poppet 153. When in contact, the front, external surface of spool 140 and the inner surface of poppet 153, as well as the front, external surface of seal 141 and the inner surface of poppet 153, provide a sealed area for the retention of pressurized fluid within female coupler 121. This displacement relieves fluid, and pressure, from within female coupler 121 before female body 142 is required to move. Relieving pressure in this fashion reduces the connect force (needed to couple male and female halves) by not having to move any seals that are subjected to unbalanced axial forces from the internal pressure during connection. The pressure within gap 167 applies an equal axial force upon the external surface of seal 141, thereby providing a balanced seal. With balanced seal 141 the only force holding spool 140 shut is spring 147 and the minimal friction due to seal 141. Since the force holding spool 140 shut is minimal, the spring (not shown) force holding male sealing member 129 closed is sufficient to open relief valve 137.

Once relief valve 137 has been opened, the pressure within female coupler 121 is relieved and male coupler 122 can be easily inserted. The further coupling sequence of the two halves is substantially similar to that described with coupling assembly 20 and, in the interest of brevity, will not be repeated here. However, it should be noted that grooves 149 in female housing 148 once again provide a channel for oil returning to the tank through vent connector 195. In this embodiment, channels 149 are not the primary source for relieving pressure, as with coupling assembly 20, since pressure relief is needed prior to moving female body 142. Relief valve 137 provides this function.

Pressure relief valve 137 is shown as an example of a valve that can be used to relieve pressure within female couple 121 as well as house a balanced seal therewithin. It should be understood that any relief valve having a balanced seal, similar to spool seal 141, could be used.

FIGS. 9a–f shows an additional quick coupling assembly embodiment 220 according to the present invention. In embodiment 220 the majority of the features are substantially similar to those shown with female coupler 121 in FIG. 5 except for the addition of a pressure assist piston 201. Embodiment 220 assists in the coupling of a female coupling half 221 with a male half 222 that is pressurized up to about twice the working pressure of female coupling 221. This feature is useful since thermal expansion of the fluid in male half 222, which causes trapped pressure to increase, is quite common. This undesired pressure increase occurs when, for example, the uncoupled male half 222 is left exposed to the radiant energy of the sun. In addition to this feature, embodiment 220 also retains the balanced features and novel features of quick coupling assembly 20 described above even though piston 201 has been added.

Couplers with integrated pistons are well known in the art. Piston 201 is slidably mounted within female coupler 221 and includes a radially enlarged end portion 203 and a reduced diameter tubular main portion 204. End portion 203 includes a front surface 203a which, upon the coupling of the two halves 221 and 222, abuts the rear axial end of seal gland 243, and a rear surface 203b that is exposed to the internal pressure of female coupler 221. Located between front and rear surfaces, 203a and 203b on the external surface of end portion 203, is a groove 205 which houses a seal 206 that prevents leakage between piston 201 and fitting 250. Tubular main portion 204 has an external surface that slidingly contacts the inner surface of seal gland 243. Seal 285 prevents fluid from leaking between this interface.

Figure 9C:
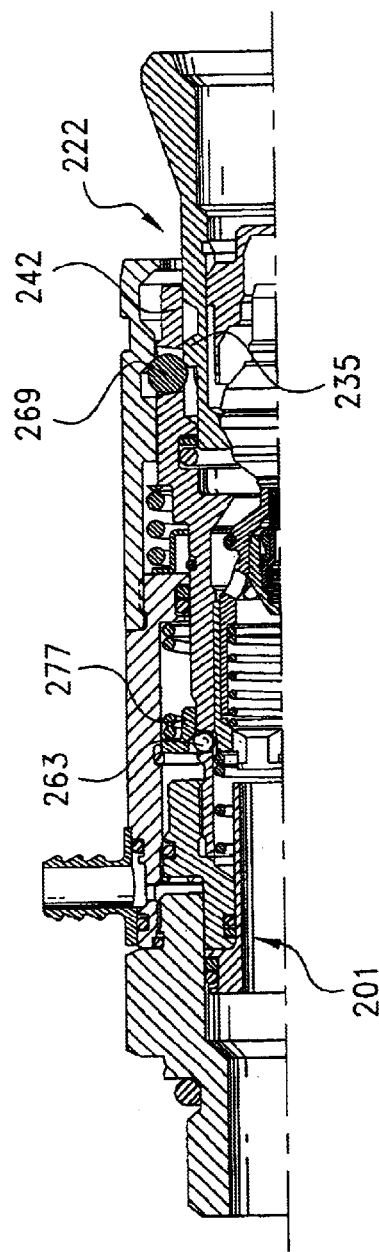
Figure 9D:
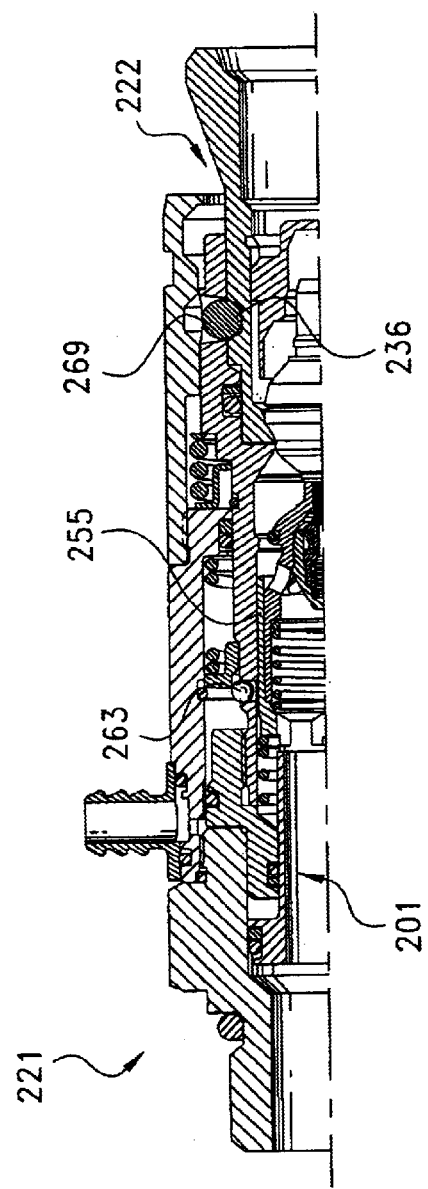
Figure 9E:
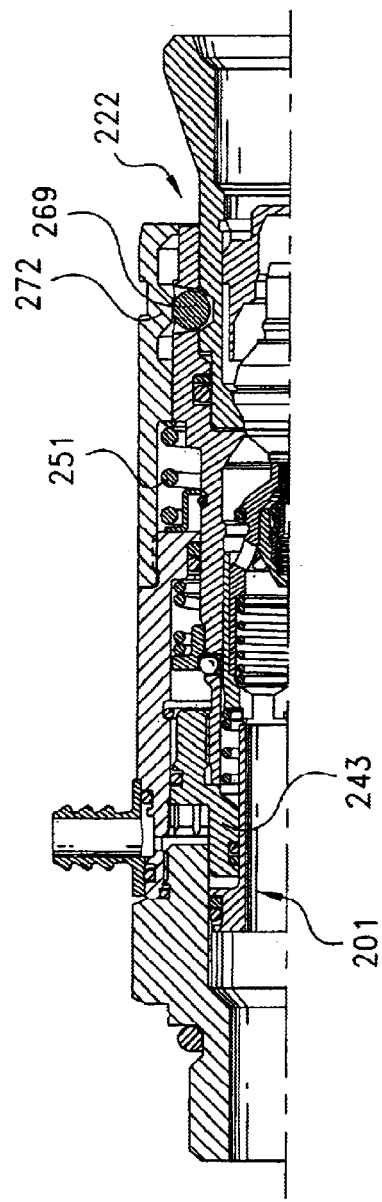

Referring to FIGS. 9a–9b, a pressurized male half 222 is guidingly received by female coupler 221. Male sealing member 229 contacts pin 239, opens pressure relief valve 237 and relieves any trapped pressure within female coupler 221. Referring to FIG. 9c, the illustrated operational step is similar to that described above for quick coupling assembly 20, with male half 222 camming female body 242 inwardly until locking balls 269 rise over male annular projection 235, allowing male half 222 to continue to move inwardly. Locking balls 263 unlock from locking sleeve 277. Referring to FIG. 9d, male half 222 can then be fully inserted, allowing sleeve 255 to slide under locking ball 263 and permit locking ball 269 to fit into groove 236. Referring to FIG. 9e, centering spring 251 returns female couple 221 to a centered position that locates locking balls 269 underneath collar annular projection 272. Finally, referring to FIG. 9f, female coupler 221 is pressurized, for example by a servo control valve (not shown) that can be attached to female coupler 221, which biases the internal componentry of coupler 221 towards male half 222. Pressurized fluid within female coupler 221 forces piston 201 into contact with seal gland 243. This locks balls 263 onto sleeve 255. Although the pressure within female coupler 221 may not be as great as that within male half 222, it acts upon piston front surface 203a, thereby providing female coupler 221 with sufficient force to move male sealing member 229 off seat 228 and thus opening male half 222.

Figure 9F:
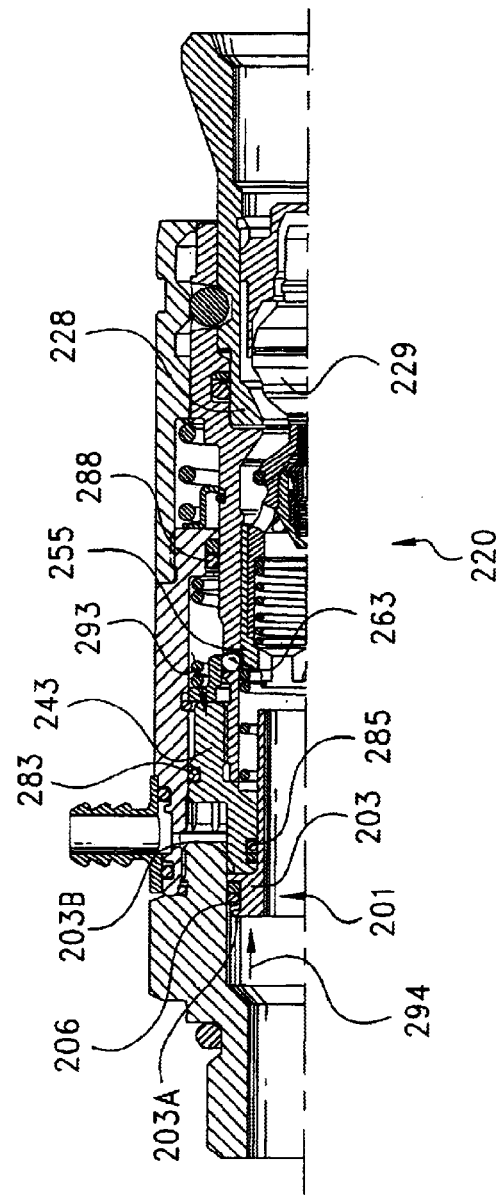

As can be seen in FIG. 9f, piston end portion rear surface 203b contacts and transmits a force onto seal gland 243 thus providing a similar balance of forces as was described relative to coupling 20 and shown in FIG. 3a. Due to this force balance, quick coupling assembly 220 remains balanced during pressurized operation. As described above, in an unbalanced coupling, as pressure increases, there will be a force building in one direction that will tend to separate the coupling. Female coupler 221 is balanced between the three seals, 206, 283 and 288 and has the same force acting in both directions as indicated by arrows 293 and 294. Force 294 represents the pressure acting on the area inside seal 206. It should be noted that force 294 does not act upon seal 285, as is the case with coupling 20. Seal 285 now provides a seal between seal gland 243 and piston 201. Force 293 represents the pressure acting on the difference of the area of seal 283 and the area of seal 288. These opposing forces, 294 and 293 are equal and balance coupler 221. Assembly 220 will only stay connected under pressure, while still retaining its ability to uncouple while balanced.

Figure 10:
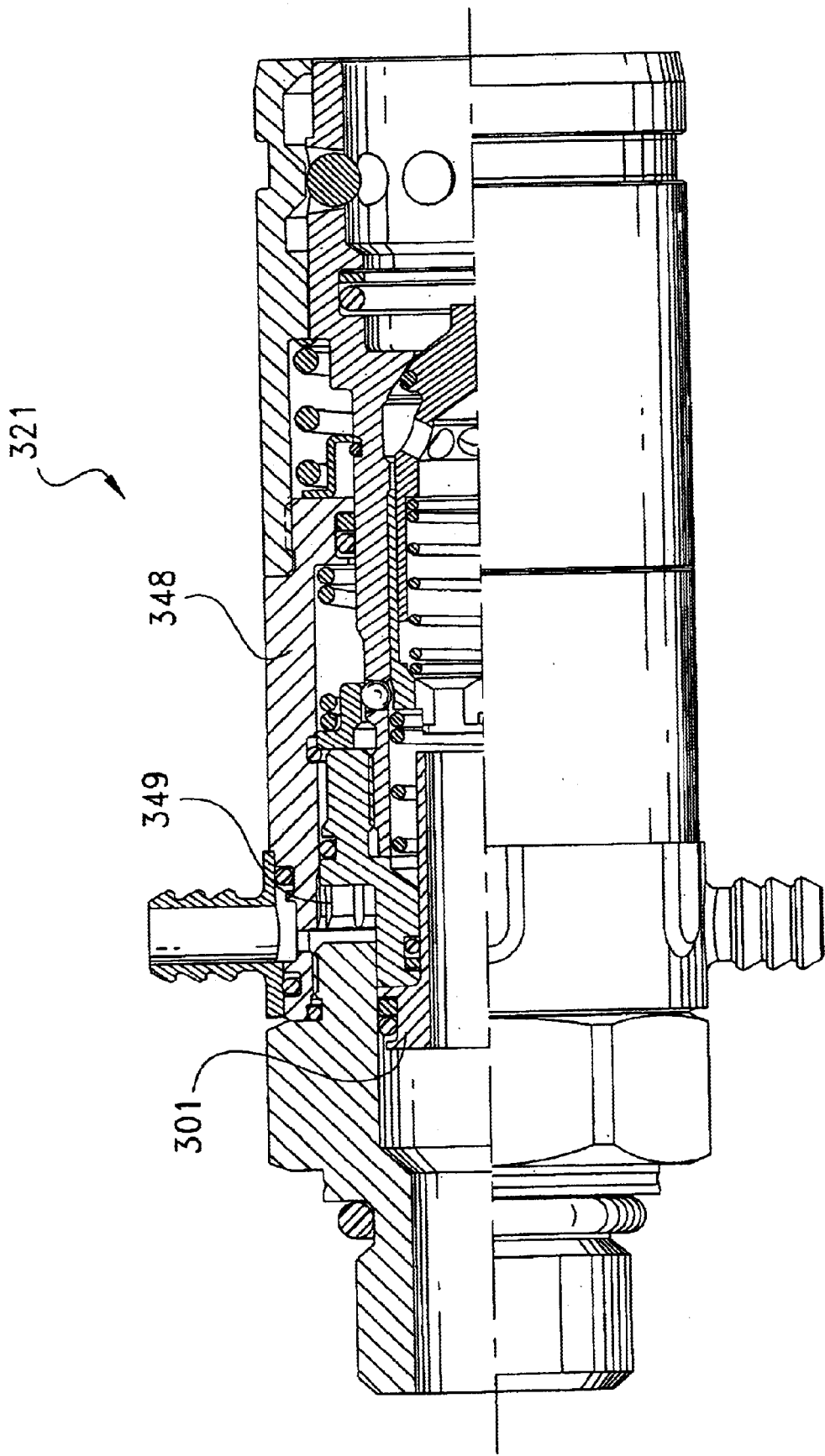
FIG. 10 is a side elevational view, partially in section, of another embodiment of the female coupler according to the present invention.

Another female coupler embodiment 321 is shown in FIG. 10. Embodiment 321 is similar to that shown and described above with reference to female coupler 221. Specifically, female coupler 321 has grooves 349 in housing 348 that provide both for pressure relief and a path for fluid in order to relieve excess pressure within female coupler 321. However, female coupler 321 does not include the pressure relief valve 137 of female couple 121. Therefore, it will take more effort to initially connect the two halves. Coupler 321 also incorporates a pressure assist piston 301, similar to previously described pressure assist piston 201, to assist in overcoming excessive pressure in the male half (not shown) while providing a balanced sealing area as was described above with reference to coupler 221. These noted features ensure that coupler 321 can relieve internally trapped fluid pressure and open the sealing member of a highly pressurized male half, while remaining relatively simple in construction. Pressure relief through grooves 349 is accomplished similar to that previously described with reference to coupling assembly 20 and overcoming the high sealing force of male sealing member is achieved similar to that previously described with reference to assembly 220.

It should be noted that the present invention is not limited to the specified preferred embodiments and principles. Those skilled in the art to which this invention pertains may formulate modifications and alterations to the present invention. These changes, which rely upon the teachings by which this disclosure has advanced, are properly considered within the scope of this invention as defined by the appended claims.

What is claimed is:

1. A female coupler, comprising:
    a generally tubular exterior portion, having an internal bore with an open forward end adapted to receive a male coupler, a flow port for supplying pressurized fluid to the internal bore, an internal surface with at least one groove section, and at least one outlet passage through said exterior portion fluidly communicating with said at least one groove section;
    a generally tubular interior portion, disposed within said internal bore and axially movable within said exterior portion from a first position, in which fluid is sealed between said exterior portion and said interior portion, and a second position, in which fluid can pass between said exterior portion and said interior portion as well as through said at least one outlet passage, said interior portion including a main cavity, opening towards said exterior portion forward end, and an internal valve seat;
    a tubular sleeve disposed within said interior portion and being axially movable, relative to said interior portion, from a locked position to an unlocked position with said interior portion, said sleeve having an internal bore with an open forward end; and
    a generally tubular poppet valve slidably guided within said sleeve internal bore and spring-biased forwardly against said valve seat to normally prevent fluid flow through said interior portion, said poppet valve including a valve seal portion, a forward projection, adapted to engage a check valve in said male coupler when said male coupler is received in said housing, and a rearward tubular portion, encapsulated within said sleeve, having an external diameter slightly less than said sleeve internal diameter.

2. The female coupler as in claim 1 wherein, when said interior portion is in said second position, fluid passing through said at least one outlet passage returns to a holding tank.

3. A female coupler, comprising:
    an exterior portion having an internal bore with an open forward end adapted to receive a male coupler, a flow port for supplying pressurized fluid to the internal bore, an internal surface with at least one groove section, and at least one outlet passage through said exterior portion fluidly communicating with said at least one groove section;
    an interior portion including a main cavity opening towards said exterior portion forward end, a circumferential groove for receiving a first peripheral seal positioned on the external surface of said interior portion, and an interior valve seat, said interior portion being disposed within said internal bore and axially movable within said exterior portion from a first position, in which said seal contacts an internal, non-grooved internal bore portion of said exterior portion, and a second position in which said seal is adjacently contacting said at least one groove section within said exterior portion; and
    a poppet valve slidably guided within said interior portion and spring-biased forwardly against said interior valve seat of said interior portion to normally prevent fluid flow through said internal body, said poppet valve including a valve seal portion, a forward projection adapted to engage a check valve in said male coupler when said male coupler is received in said exterior portion, and a rearward tubular portion.

4. The female coupler as in claim 3, further comprising a sleeve, having an internal bore with an open forward end, disposed between said interior portion and said poppet valve, and being axially movable relative to said interior portion and said poppet valve from a locked position to an unlocked position with said interior portion.

5. The female coupler as in claim 4 wherein said poppet valve tubular portion is nested within said sleeve and has an outside diameter generally similar to that of the inside diameter of said sleeve.

6. The female coupler as in claim 3 wherein said interior portion is balanced and comprised of a seal gland and a body, said first peripheral seal resides in an external groove in a frontal surface of said seal gland, with a second peripheral seal residing in a circumferential groove in said seal gland external surface and a third peripheral seal residing in a groove in said exterior portion internal surface.

7. A female coupler, comprising:
    an exterior portion having an internal bore with an open forward end adapted to receive a male coupler, a flow port for supplying pressurized fluid to the internal bore, an internal surface with at least one groove section, and at least one outlet passage through said exterior portion fluidly communicating with said at least one groove section;

an interior portion including a main cavity opening towards said exterior portion forward end, a circumferential groove for receiving a seal positioned on the external surface of said interior portion and an interior valve seat, said interior portion being disposed within said exterior portion bore and axially movable within said exterior portion from a first position, in which said seal is axially spaced from said at least one groove in said exterior portion, and a second position in which said seal is axially aligned with said at least one groove section within said exterior portion;

a poppet valve slidably received within said interior portion and spring-biased forwardly against said interior valve seat of said exterior portion to normally prevent fluid flow through said interior portion, said poppet valve including a main cavity, opening towards said exterior portion forward end, a valve seal portion, a forward projection, adapted to engage a check valve in said male coupler when said male coupler is received in said exterior portion, and a rearward tubular portion; and a pressure relief valve fixedly positioned within said poppet valve main cavity having a pressure relief pin located at the front axial end of said relief valve, adapted to contact said male coupler check valve and relieve pressure within said female coupler when said interior portion is in said first position and prior to said forward projection engagement with said male coupler.

8. The female coupler as in claim 7 wherein said relief valve further includes a valve body having an internal cavity that houses a spool with an external circumferential groove for receiving a balanced seal that prevents the escape of fluid from said female coupler prior to said pin contacting said male coupler check valve.

9. A female coupler for use as a fluid connector, comprising:

an exterior portion having an internal bore with an open forward end adapted to receive a male coupler, a flow port for supplying pressurized fluid to the internal bore, an internal surface with at least one groove section and at least one outlet passage through said exterior portion fluidly communicating with said at least one groove section;

an interior portion disposed within said housing bore and axially movable within said exterior portion from a first position, in which fluid is sealed within said female coupler, and a second position, in which fluid can exit said female coupler through said at least one groove section, said interior portion including a main cavity, opening towards said housing forward end, and an internal valve seat;

a poppet valve slidably received within said interior portion and spring-biased forwardly against said valve seat to normally prevent fluid flow through said interior portion, said poppet valve including a valve seal portion, and a forward projection adapted to engage a check valve in said male coupler when said male coupler is received in said exterior portion; and a generally annular piston disposed and slidably received within said exterior portion, said piston including a tubular main portion, a radially enlarged annular end portion and a central bore for fluid flow, said tubular main portion being disposed and slidably received within said interior portion and having an outer surface in sealing contact with the inner surface of said interior portion, said radially enlarged end portion engaging said interior portion, when moved axially to assist in moving said poppet valve axially against excessive pressures in said male coupler.

10. The female coupling as in claim 9 wherein said interior portion includes a body and a seal gland which houses a peripheral seal that is axially spaced from said at least one groove section in said exterior portion, when in said interior portion first position, and axially aligned with said at least one groove, when in said interior portion second position.

11. The female coupling as in claim 10 wherein said peripheral seal is balanced and resides in an external groove of said seal gland, said piston radially enlarged end portion having a balanced seal residing in a circumferential groove in its external surface, and said exterior portion having a balanced seal residing in a circumferential groove located in its interior surface.

12. The female coupling as in claim 9 further including a sleeve disposed within said interior portion and axially movable relative to said interior portion from a locked position to an unlocked position with said interior portion, said sleeve having an internal bore with an open forward end.

13. The female coupling as in claim 12 wherein said poppet valve has a rearward tubular portion nested within said sleeve and having an outside diameter slightly less than the inside diameter of said sleeve.

14. The female coupling as in claim 9 wherein said poppet valve further includes a main cavity opening towards said exterior portion forward end for receiving a pressure relief valve fixedly positioned within said poppet valve main cavity, said relief valve having a pressure relief pin located at its front axial end, adapted to contact said male coupler check valve and relieve pressure within said female coupler when said interior portion is in said first position and prior to said forward projection engagement with said male coupler.

15. A female coupler used as a fluid connector, comprising:

an exterior portion having an internal bore with an open forward end adapted to receive a male coupler, a flow port for supplying pressurized fluid to the internal bore, an internal surface with at least one groove section and at least one outlet passage through said exterior portion for fluid communication with said at least one groove section;

an interior portion disposed within said internal bore and axially movable within said exterior portion from a first position, in which fluid is sealed within said female coupler, and a second position, in which fluid can exit said female coupler through said at least one groove section, said interior portion including a main cavity opening towards said exterior portion forward end and an internal valve seat; and a poppet valve slidably received within said interior portion and spring-biased forwardly against said valve seat to normally prevent fluid flow through said interior portion, said poppet valve including a valve seal portion, a forward projection adapted to engage a check valve in said male coupler when said male coupler is received in said exterior portion.

16. The female coupling as in claim 15 wherein said interior portion includes a body and a seal gland, said seal gland housing a peripheral seal that is axially spaced from said at least one groove section in said interior portion first position and axially aligned with said at least one groove section in said interior portion second position.

17. The female coupling as in claim 15 further including a generally tubular sleeve, disposed within said interior portion, and axially movable, relative to said interior portion, from a locked position to an unlocked position with said interior portion, said sleeve having an internal bore with an open forward end.

18. The female coupling as in claim 17 wherein said poppet valve further includes a rearward tubular portion which is received within said sleeve and has an outside diameter slightly less than the inside diameter of said sleeve.

19. The female coupling as in claim 18 wherein said sleeve has an internal shoulder for limiting the axial movement of said poppet valve.

20. The female coupling as in claim 15 wherein the interface between said exterior portion and said interior portion includes a plurality of spaced grooves, within said groove portion, said interface further including a plurality of balanced seals for preventing leakage of the pressurized fluid between said exterior portion and said interior portion.

21. The female coupling as in claim 16 wherein said seal gland further includes a first balanced seal residing in a circumferential groove in the rear external surface thereof, said peripheral seal is balanced and resides in a circumferential groove in the front external surface thereof, said exterior portion including a balanced seal residing in a circumferential groove located in the interior surface thereof.

22. The female coupling as in claim 21 wherein said poppet valve is held against said internal valve seat by a spring, residing within said poppet valve, when said female coupling is fully pressurized and not in contact with said male coupler.

\* \* \* \* \*